(No Model.)
H. HALL & J. W. COOK.
POST HOLE DIGGER.
No. 467,751. Patented Jan. 26, 1892.
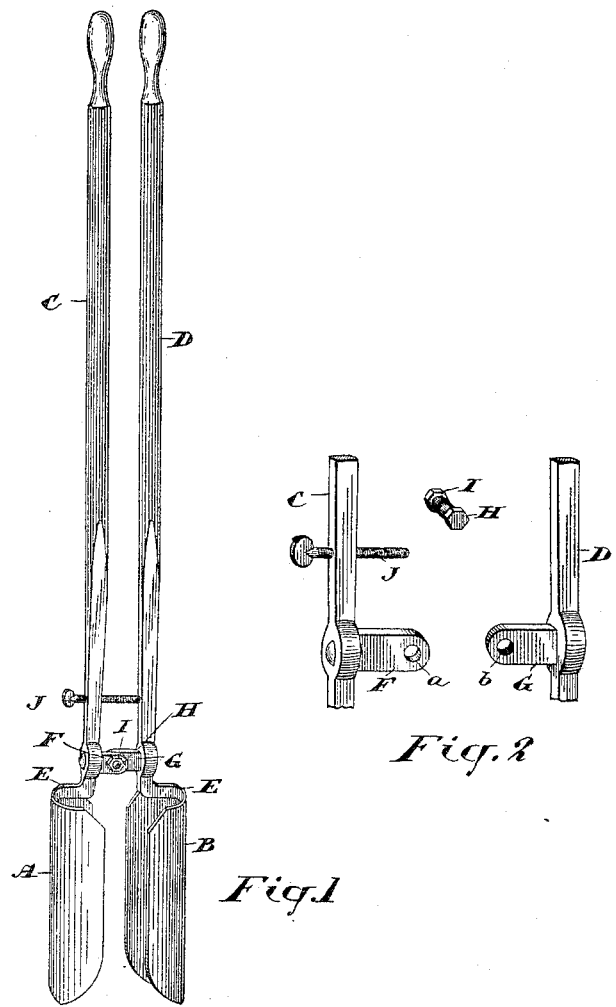

UNITED STATES PATENT OFFICE.

HENRY HALL AND JOSEPH W. COOK, OF PORT PERRY, CANADA.

POST-HOLE DIGGER.

SPECIFICATION forming part of Letters Patent No. 467,751, dated January 26, 1892.

Application filed August 20, 1891. Serial No. 403,172. (No model.) Patented in Canada May 19, 1891, No. 36,619.

*To all whom it may concern:*

Be it known that we, HENRY HALL and JOSEPH WILLIAM COOK, both of the town of Port Perry, in the county of Ontario, in the Province of Ontario, Canada, have jointly invented a certain new and Improved Post-Hole Digger, (for which we have obtained Letters Patent in Canada dated May 19, 1891, No. 36,619,) of which the following is a specification.

The object of the invention is to design a machine by which a post-hole may be quickly and easily dug; and it consists in the peculiar construction, arrangement, and combination of parts hereinafter more particularly described, and then definitely claimed.

In the accompanying drawings, Figure 1 is a perspective view of our improved post-hole digger. Fig. 2 is a detail of the joint.

A and B represent two curved spades, preferably made of sheet-steel with sharpened edges. These spades are rigidly fastened to their respective handles C and D. A band E is formed, as shown, on the end of each of the handles referred to, so that while the connection between the spade and the handle shall be at the center of the spade the side edges of the spade shall be substantially parallel with the main portion of the handle. A lug F extends from the handle C and an extending lug G from the handle D, both lugs F and G being above the crank E. The lug F has a hole $a$ made through it sufficiently large to permit the free passage of the bolt H, while the lug G has a hole $b$ made through it and screw-threaded to receive the screwed end of the bolt H. In order to connect the two lugs together, the bolt H is slipped through the hole $a$ and is screwed through the hole $b$, the nut I being screwed on the end of the bolt H to jam against the lug G and thus hold the bolt in position, the pivot-point between the two lugs being formed of a portion of the bolt H, which passes through the hole $a$. An adjustable set-screw J is screwed through the handle C and arranged to butt against the handle D. This set-screw is located, as indicated, above the lugs and is used for the purpose of preventing the two handles C and D being brought closer together than desired.

To operate our post-hole digger, the handles C and D are grasped and are moved so as to force the spades A and B into the ground at the point where the post-hole is to be made. When the spades have penetrated the ground sufficiently far to secure a spadeful or such quantity of earth as the digger may deem necessary, the handles C and D are pulled apart, and as they are pivoted together, as shown and described, the cutting-edges of the spades A and B are brought toward each other, forming a scoop or receptacle to hold the earth they surround, thereby enabling the said earth to be easily removed from the hole. This operation is repeated until the hole is made the desired depth. Should a stone be encountered, the set-screw J is adjusted so as to permit the handles to be brought together and thus open the mouth of the spades, so that they will pass over the stone. When the stone has been removed, the screw J may be reset.

What we claim as our invention is—

Two curved spades A and B, rigidly secured, respectively, to a bend E, formed on the end of each of the handles C and D, in combination with the lugs F and G, projecting from the handles C and D and pivoted on the bolt H, and an adjusting set-screw J, substantially as and for the purpose specified.

Port Perry, June 17, 1891.

HENRY HALL.
JOSEPH W. COOK.

In presence of—
HUBERT L. EBBELS,
HENRY BEWELL.